Dec. 15, 1925.
C. J. COIL
1,565,987
VALVE
Filed March 15, 1923
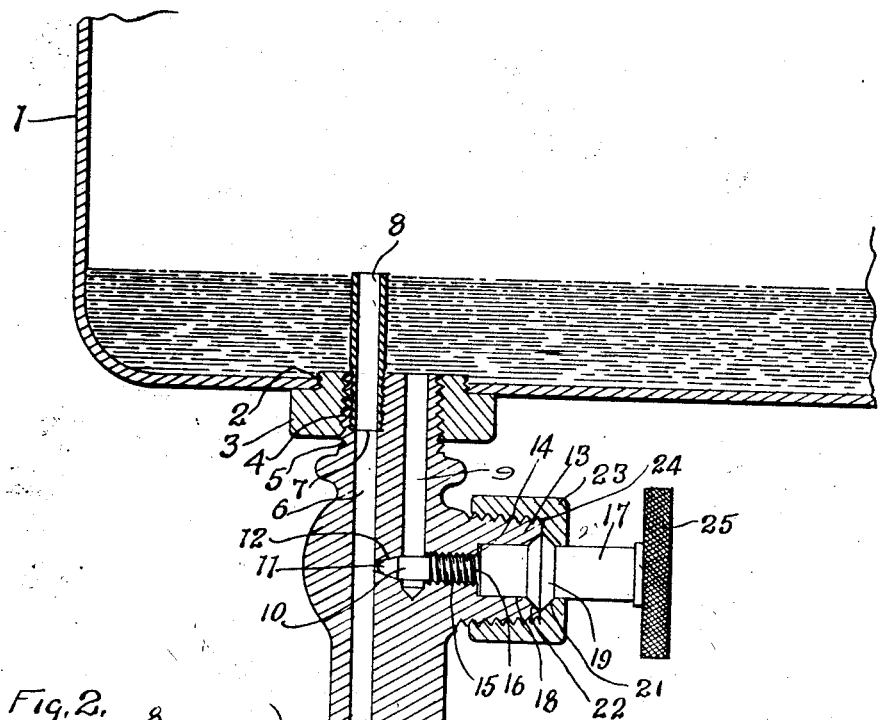
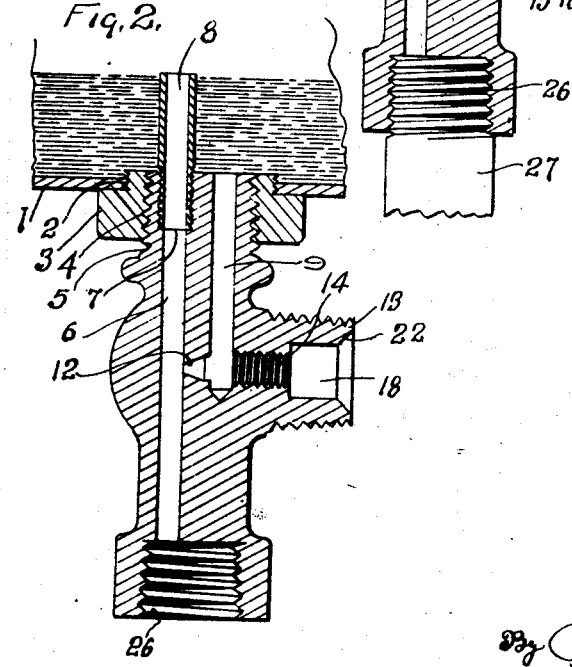
INVENTOR
Charles James Coil,
By Toulmin & Toulmin,
Attorneys Patented Dec. 15, 1925.

1,565,987

UNITED STATES PATENT OFFICE.

CHARLES JAMES COIL, OF DAYTON, OHIO.

VALVE.

Application filed March 15, 1923. Serial No. 625,401.

*To all whom it may concern:*

Be it known that I, CHARLES JAMES COIL, a citizen of the United States, residing at Dayton, in the county of Montgomery and State of Ohio, have invented certain new and useful Improvements in Valves, of which the following is a specification, reference being had therein to the accompanying drawing.

My invention relates to valves, and in particular to valves controlling reserve supplies of liquids in tanks.

It is the object of my invention to provide a readily operable valve of simple construction, of such a character that a reserve supply will always be maintained in a tank of liquid, such as a gasoline tank in an automobile, until the operator, due to the stoppage of the engine for lack of fuel, turns the valve and makes available the reserve supply of fuel in the tank.

It is a further object to provide a valve of this character which is easily cleaned and cheaply manufactured.

It is an additional object of my invention to provide a valve which also facilitates the draining of the tank.

Referring to the drawings:

Figure 1 is a section through the valve and tank showing the parts in a position to maintain the reserve supply of liquid untouched.

Figure 2 is a section of the valve showing it in position for allowing the reserve liquid to flow out of the tank.

Referring to the drawings in detail:

1 is a tank, having an orifice 2 at the bottom thereof. This orifice 2 has threaded therein a supporting nut 3. This nut is internally threaded as at 4; the upper end of the valve casing 5 engages therewith. This valve casing has a pair of tubular passageways. One of these passageways, which is known as the main passageway 6, through which the major portion of the liquid passes from the tank 1, passes completely through the valve casing. At its entrance opening 7, this passageway 6 has attached a standpipe 8. The height of this standpipe will determine the amount of reserve liquid kept in the tank, because when the liquid falls below the top of this pipe it can not make its escape from the tank until the reserve passageway 9 is opened by the needle valve 10.

This needle valve 10 is located at the bottom of the reserve passageway 9. The head 11 of the needle valve fits into a correspondingly formed passageway 12, which connects the reserve passageway and the main passageway to one another. An angularly projecting portion 13 of the valve casing 5 is provided. This portion 13 is internally threaded, as at 14, to receive threads 15 on the needle valve shaft 16. This shaft is enlarged as at 17, and fits in an enlarged passageway 18 in portion 13. Surrounding the enlarged portion 17 is a sealing collar 19, integral with the stem and having tapered faces 20, for engagement with similarly tapered faces 21 and 22, respectively, on the clamping nut 23 and the outer face of portion 13. This collar forms a seal to prevent the leakage of liquid. The clamping nut 23 is threaded on the exterior of portion 13, as at 24. The needle valve shaft is provided with a handle 25 for its actuation. At the bottom of the valve casing 5 is an internally threaded portion 26, into which the pipe 27, leading to the carburetor, is threaded.

In the operation of an automobile when it is desired to utilize the reserve supply of gasoline in tank 1, the nut 23 is loosened sufficiently to permit valve stem 17 to be screwed outwardly to thereby open the port 12. Nut 23 is then tightened until it is wedged against the sloping face of collar 19. The valve is thus held in open position so that jolting of the automobile cannot displace it, and, by reason of the tight fit between the tapered face 20 of the collar 19 and the tapered face 21 of the nut 23, no gasoline can leak along the valve stem and past the clamping nut.

It will be observed that the horizontal passageway which receives the needle valve stem or valve member communicates with the base of the reserve passageway, and when the valve member is removed as shown in Fig. 2, serves as a convenient method of draining the tank. The projecting portion of 13 forms a spigot for the ready conveyance of the drained fluid to one side of the valve casing and carburetor pipe 27, thus facilitating the placing of a container beneath the spigot, and preventing the inflammable liquid from being spread into undesired locations, such as drains and the like.

It will be understood that my invention is adaptable to varying types of tanks, and it will also be understood that I do not desire to confine myself to the details of its application, but I do desire to comprehend within it such necessary modifications as may be fairly embraced within the scope of the invention.

Having thus fully described my invention, what I claim as new, and desire to secure by Letters Patent, is:—

A reserve valve for gasoline tanks, comprising a casing provided with a passageway, said casing having an exteriorly threaded projecting portion provided with an enlarged recess having a tapered mouth formed at the outer end of said projecting portion, said casing and projecting portion having a recess smaller in diameter than the enlarged recess, extending from the enlarged recess to the passageway and having a threaded wall, a hand operated threaded stem adapted to close said passageway and having an enlarged portion provided with a collar having tapered faces, said enlarged portion and collar extending respectively into the enlarged recess and tapered mouth, the threads on the stem engaging the threads of the small recess and a cap nut engaging the threads of said projecting portion and having a tapered recess engaging a portion of the tapered surface of the collar.

In testimony whereof, I affix my signature.

CHARLES JAMES COIL.